A. J. MEIER, W. L. SWIFT & E. L. RELLER.
CLEARING AND TRANSFER MECHANISM FOR CALCULATING MACHINES.
APPLICATION FILED MAR. 26, 1914.

1,160,742.

Patented Nov. 16, 1915.
5 SHEETS—SHEET 1.

Witnesses:
Harry H. Reiss.
George G. Anderson.

Inventors:
Albert J. Meier, William L. Swift, & Edwin L. Reller,
By Hugh K. Wagner
Their Attorney.

A. J. MEIER, W. L. SWIFT & E. L. RELLER.
CLEARING AND TRANSFER MECHANISM FOR CALCULATING MACHINES.
APPLICATION FILED MAR. 26, 1914.

1,160,742.   Patented Nov. 16, 1915.
5 SHEETS—SHEET 3.

Witnesses:
Harry H. Reis
George G. Anderson

Inventors:
ALBERT J. MEIER, WILLIAM L. SWIFT, and EDWIN L. RELLER,
By Hugh K. Wagner
Their Attorney.

A. J. MEIER, W. L. SWIFT & E. L. RELLER.
CLEARING AND TRANSFER MECHANISM FOR CALCULATING MACHINES.
APPLICATION FILED MAR. 26. 1914.

1,160,742.

Patented Nov. 16, 1915.
5 SHEETS—SHEET 5.

Fig. 13.

UNITED STATES PATENT OFFICE.

ALBERT J. MEIER, OF GLENDALE, AND WILLIAM L. SWIFT AND EDWIN L. RELLER, OF ST. LOUIS, MISSOURI, ASSIGNORS TO THE DUCO ADDING MACHINE COMPANY, OF ST. LOUIS, MISSOURI, A CORPORATION OF MISSOURI.

CLEARING AND TRANSFER MECHANISM FOR CALCULATING-MACHINES.

1,160,742.  Specification of Letters Patent.  Patented Nov. 16, 1915.

Original application filed April 13, 1912, Serial No. 690,514. Divided and this application filed March 26, 1914. Serial No. 827,438.

*To all whom it may concern:*

Be it known that we, ALBERT J. MEIER, WILLIAM L. SWIFT, and EDWIN L. RELLER, citizens of the United States, said ALBERT J. MEIER residing at Glendale, in the county of St. Louis, State of Missouri, and said WILLIAM L. SWIFT residing at the city of St. Louis, State of Missouri, and said EDWIN L. RELLER temporarily residing at the city of St. Louis, State of Missouri, have invented certain new and useful Improvements in Clearing and Transfer Mechanisms for Calculating-Machines, of which the following is a specification.

This application is a division and continuation of one filed by us April 13, 1912, Serial No. 690,514.

The present invention relates to improvements in calculating machines and is more especially applicable to calculating machines of the type embodied in our aforesaid application, the present improvement being directed particularly to the accumulator.

One of the objects of the present invention is to provide an accumulator in which the carry-overs between the accumulator wheels are produced by reciprocatory members, which have the carry-over pawls pivoted thereto, a pair of pivoted latches being provided for each reciprocatory member, except the particular member that bears the carry-over pawl between the units and tens wheel for which only one pivoted latch is provided, to hold said member normally in inoperative position, the release of both latches from such holding engagement with their respective reciprocatory member being necessary to allow the latter to move in one direction to the position to effect the necessary carry-over operation when said member is moved in the opposite direction.

Another object of the present invention is to provide improved mechanism for actuating all reciprocatory members that have moved their carry-over pawls to operative positions.

A further object of the present invention is to provide simple and efficient mechanism for clearing the accumulator after each total printing operation.

With these objects in view, the present invention consists of the novel features of construction and arrangement of parts hereinafter more fully described and pointed out in the claims.

In the accompanying drawings forming part of this specification, in which like numbers of reference denote like parts wherever they occur.

The accumulator is actuated in the usual manner by the racks 1 on the rack bars 2, there being one such rack bar for each accumulator wheel 3. The front ends of the rack bars 2 and their coöperating plates 4, which are reciprocatively connected therewith, normally rest upon a supporting cross-member 5, which is arranged at the entrance of the accumulator and is supported by the frames 6, said cross-member bearing a comb 7 through which said rack bars and plates operate, whereby such parts are maintained in proper spaced relation. The teeth of each rack 1 are so arranged that when the bars 2 move into the accumulator they travel without engagement past the teeth of their respective accumulator ratchets 8, but when the rack bars 2 are returning toward their initial position, same are raised by mechanism about to be described, so that during such return movement racks 1 will engage their respective ratchets 8 and thus actuate the accumulator wheels 3 to produce the usual accumulator results. Such actuation of the ratchets 8 by the racks 1 causes the rotation of the accumulator wheels 3, which are rotatably mounted on shaft 9, Figs. 3 and 4, and are separated by division plates 10. Each of the ten ratchets 8 is fastened to an accumulator wheel 3, of which there are ten, as is, also, each of the rings 11, Figs. 3, 4, and 12, said wheels exceeding by one the number of rack bars 2. Each of said rings is provided on its inner edge with a projection 12, Fig. 12, which protrudes into the path of rotation of a tooth upon comb 13, Fig. 4, when the latter is raised by the depression of the clearing key 14. When the clearing key 14 is depressed, it actuates intermediate parts which raise comb 7 into space 15, so that projections 12 will be in the path of travel of the teeth of comb 13, when same is rotated with shaft 9, which occurs after clearing key 14 has been depressed and the operating handle or lever (not shown in the drawings), also, has been depressed, such raising of said comb being hereinafter described.

The raising of the racks 1, as hereinabove indicated, into engagement with their respective ratchets 8 is produced by the raising of the jack 16, Fig. 3, which in rising presses against the underside of each rack bar 1 that has been moved forwardly into the accumulator and thereby elevates these particular racks into engagement with their respective ratchets 8. Said jack 16 is located immediately adjacent to the cross-member 5, and embodies a pair of end members 17, which are connected by and loosely mounted on a cross-bar 18. Vertical movement and a limited extend of forward and backward movement are permitted the upper portion of the jack by the link 19, Fig. 2, which is pivotally connected to one of the main side plates 20 of the accumulator frame or casing at the point 21, the opposite end of said link being slotted at 22 and connected to an end member 17 of the jack by pin 23. The cross-bar 18 is secured to a pair of arms 24, Figs. 1, 2, and 3, each of these arms being secured to shaft 25 journaled in side plates 20. The end members of the jack have extensions 26 adapted to engage the laterally-turned upper ends 27 of a pair of detents 28, which are pivoted at 29 to side plates 20. Springs 30 hold the detents 28 normally in position to allow the ends of the arms 24 to rest thereon and thereby retain the jack 16 normally in its elevated position, one end of each of these springs being attached to an eccentrically arranged eye 31 on the respective detent while the opposite end of the spring is attached to the respective end member of the jack, whereby the jack will be pulled down after the arms 24 are released by the detents. The detents 28 are disengaged from supporting engagement with arms 24, when the upper portion of jack 16 is rocked toward the right, Figs. 1 and 3, the disengagement being effected by the extensions 26, which bear against and rock the respective detents 28, and the rocking of the jack 16 being produced by the engagement of the front end of any rack bar 1, when the latter is moved into the accumulator in the usual manner. Each plate 4 is provided with a finger 32, Fig. 3, which is preferably located near the front end of same. The fingers 32 on said plate 4 extend toward the interior of the accumulator and support the cross-member 33 which connects a pair of arms 34, said arms being adapted to swing in unison and being pivotally mounted on a cross-rod 35, which is supported by frames 6. The free ends of the arms 34 are formed with upwardly-directed hooks 36, which are held normally in lowered position, as clearly illustrated in Fig. 3, by means of springs 37. When a rack bar 2 that has been moved into the accumulator is raised by the jack 16, so as to raise the rack 1 on said bar into engagement with its respective ratchet 8, the finger 32 borne by the plate 4 that cooperates with said rack bar raises the hooks 36 into engagement with the rear side of jack 16 and thereby locks said jack in its elevated position until said rack bar 2 and plate 4 return to their initial position.

The periphery of each accumulator wheel 3 carries a circular row of type-faces 38 bearing consecutively arranged numerals, and, also, a type-face 39 bearing a zero character. Said wheel 3 is normally held out of printing position by means of a member 40, Fig. 3, there being one of these members provided for each accumulator wheel. Each member 40 contains slots 41 and 42 to allow the cross-rods 43 and 44, respectively, to extend therethrough, and one end of said member bears an upwardly-directed finger 45, which is adapted to enter a wedge-shaped notch 46 formed in the periphery of the respective accumulator wheel 3, the slot 41 being preferably straight and the slot 42 being preferably curved in order to guide the movement of the finger 45 in such manner that when the member 40 is moved away from its wheel 3, the finger 45, in leaving the notch 46, rotates the wheel 3 counter-clockwise, Fig. 3, so as to move the zero type-face 39 on said wheel from its normal or non-printing position to the print point designated by arrow A, and, when the member 40 is moved toward the wheel 3 after the accumulator is cleared in the manner hereinafter described, the finger 45 in entering said notch, rotates said wheel clockwise, Fig. 3, and thereby moves the zero type-face 39 back to its normal or non-printing position. A latch 47, Fig. 3, is provided for each member 40, each of these latches being pivotally mounted on cross-rod 48 and bearing a projection 49, which is arranged to coöperate with the shoulder 50 on its respective member 40, so as to hold said member normally in an elevated position as depicted in Fig. 3. The forward end of each latch bears a laterally-turned projection 51, which is adapted to bear upon the top of its respective plate 4, the latter when lowered and resting on cross-member 5 permitting the latch 47 to remain in locked engagement with its respective member 40, and when such plate is elevated by the jack 16, said latch will be elevated, thereby disengaging it from its respective member 40. This disengagement permits member 40 to descend under the influence of its spring 52, the finger 45 on such member then acting to turn the respective accumulator wheel sufficiently to bring the zero type-face 39 thereon into printing position, continued movement of said member causing its finger to move entirely out of the notch 46 in said wheel. After a member 40 is lowered as just described, it remains in its lowered position until raised to its normal position as hereinafter described, when the clearing key 14 and the operating handle or lever are depressed to clear the accumulator. Springs 53 tend to rotate the latches 47 counter-clockwise, Fig. 3, and thereby hold said latches in locking position.

Figure 1:
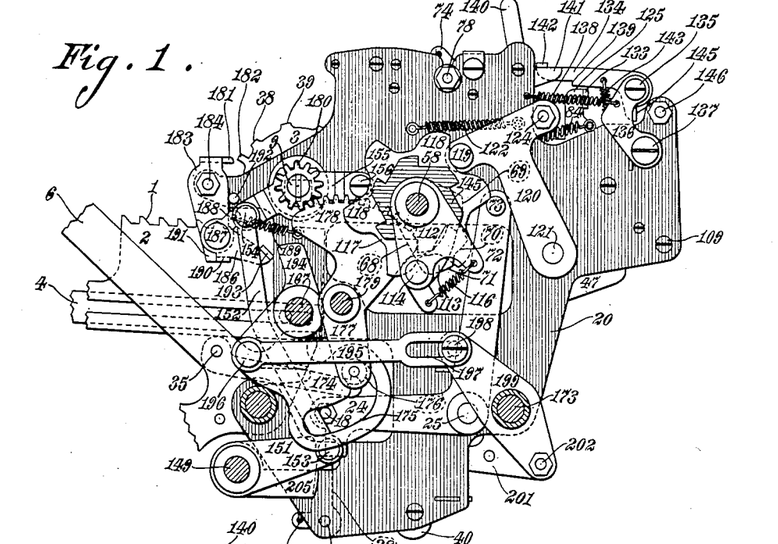
Figure 1 is a right side elevation of the accumulator.
Figure 2:
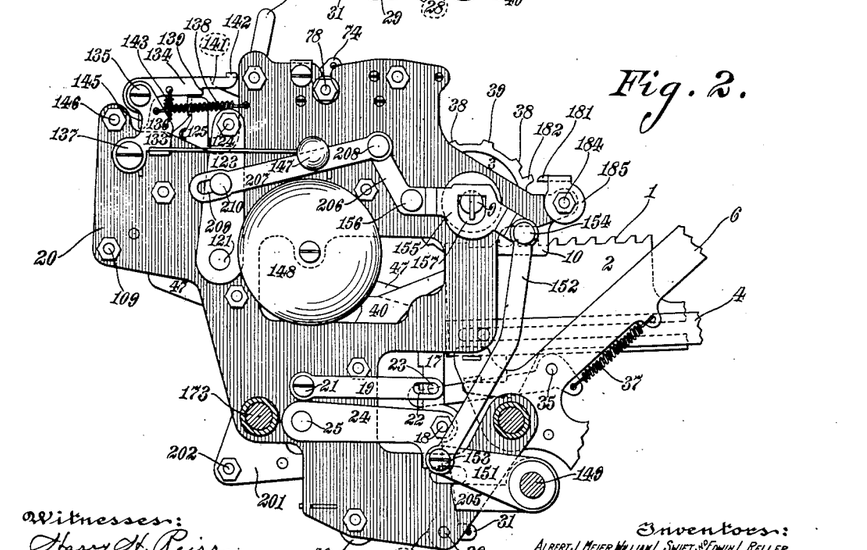
Fig. 2 is a left side elevation of same.
Figure 13:
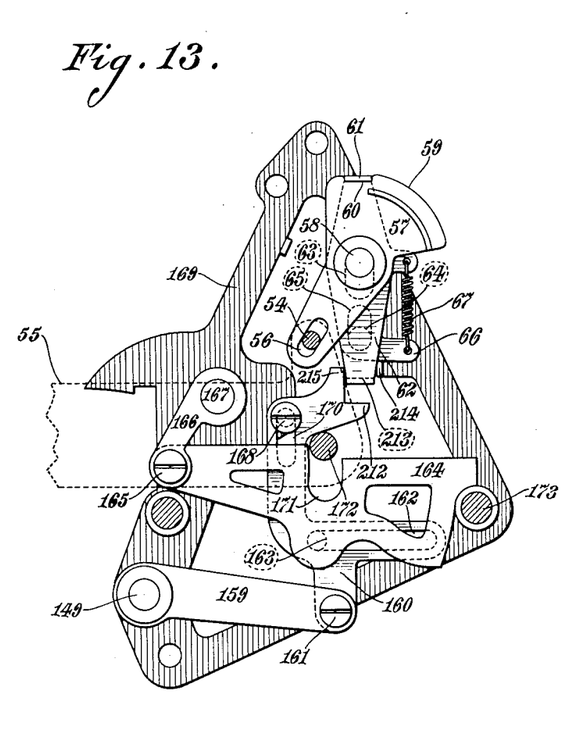
Fig. 13 is a detailed view showing the operative connections between the accumlator and the main actuating bar of the machine.

A pin 54, Fig. 13, borne by the operating bar 55 projects into a radial slot 56 in the crank plate 57, which is rotatably mounted on shaft 58. The upper edge of the crank plate 57 has a concentric portion 59 and, also, a notch 60, the latter being adapted to receive a laterally-turned projection 61 formed on a second plate 62. The plate 62 has a central slot 63 which accommodates the shaft 58 and permits the plate 62 to shift transversely thereof, the plate 62, also, bearing a pin 64 which operates in a radial slot 65 formed in a plate 66, the latter plate being fixed to rotate with shaft 58. The plate 62 is revoluble with the plate 66 and is shiftable to control the operative relation between the latter and the crank 57, the projection 61 on said plate 62 being normally held in notch 60 by spring 67. The shaft 58, also, has a cam 68 fixed thereon, Fig. 1, this cam having the successively arranged stepped surfaces 69, 70, and 71. One of the arms 24 of the jack 16 is part of a bell-crank, the other arm 72 of which has a pin 73 arranged to coöperate with the cam 68. When the jack 16 is supported in its normal or elevated position, the bell-crank arm 72 holds the pin 73 normally out of engagement with cam 68 as illustrated in Fig. 1, but, when the jack is caused to drop as herein-above described, same rotates the bell-crank arm 72 toward the left, thereby moving the pin 73 into engagement with the surface 69 of the cam 68. In order to raise the jack 16 so as to elevate such of the rack bars 2 as have been pushed into the accumulator in the usual manner, the operating handle or lever must be depressed, by which movement not only said jack 16 is raised, but, also, the printing of the item is accomplished in the usual manner. When the operating handle or lever is depressed by the operator, the operating bar 55 travels away from the operator and thereby causes the crank plate 57 to rotate counter-clockwise, Fig. 13, and this crank plate operates through the medium of the plate 62 and its projection 61 and plate 66 to rotate the main accumulator shaft 58 counter-clockwise, thereby causing the cam surface 69 to press against the pin 73 borne by the bell-crank arm 72, thereby rotating the bell-crank clockwise, Fig. 1, until the pin 73 thereon reaches the part 70 of the cam 68, with the result that the arm 24 of the bell-crank and its companion arm 24 raise the jack 16, and the jack, in turn, operates to raise the ends of such rack bars 2 as rest thereon and their associated plates 4 and, also, the ends of such plates 4 as rest thereon. These rack bars, however, are not at this time raised sufficiently to cause their rack teeth 1 to engage their respective ratchets 8, although the plates 4 are at this time raised sufficiently to lift their respective latches 47, the latter then releasing or unlocking their corresponding members 40, thus permitting the latter to be pulled downward by their respective springs 52, so that said members operate to turn their accumulator wheels 3, in order to move the zero type-faces 39 on said wheels into printing position as herein-above described. After the accumulator wheels 3 have been rotated to present their zero type-faces 39 to the printing point, the further rotation of cam 68 causes the cam surface 70 to press against the pin 73, thereby rocking the bell-crank arm 72 further in a clockwise direction until said pin rides on the surface 73 of said cam, whereby the arms 24 lift the jack 16 further until same reaches its initial position, the rack bars being then elevated sufficiently to engage the rack teeth 1 thereon with the ratchets 8, and hence when the rack bars 2 and their associated plates 4 are restored to initial position, the accumulator wheels will be rotated clockwise, Fig. 3.

Figure 3:
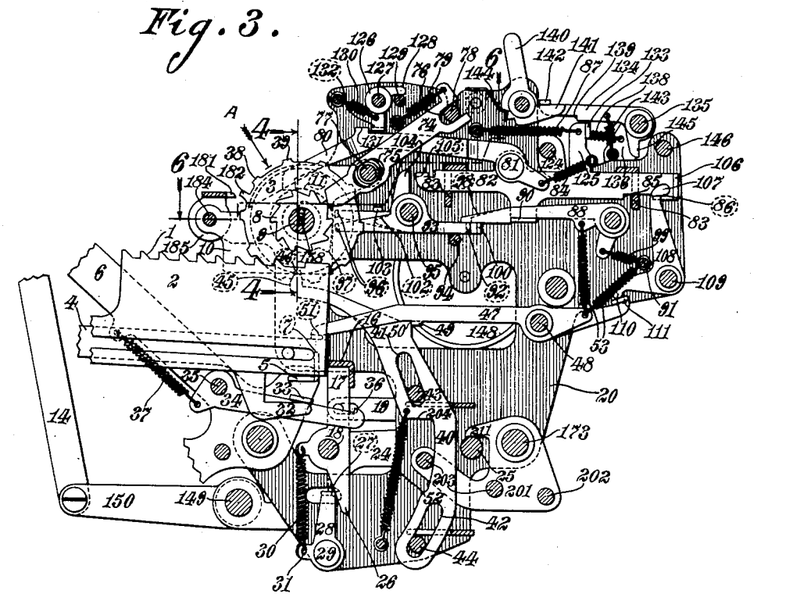
Fig. 3 is a sectional view on the line 3—3, Fig. 5.
Figure 4:
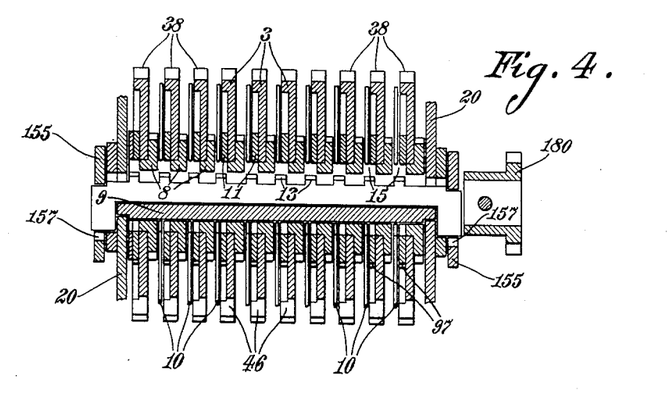
Fig. 4 is a sectional view on the line 4—4, Fig. 3.
Figure 5:
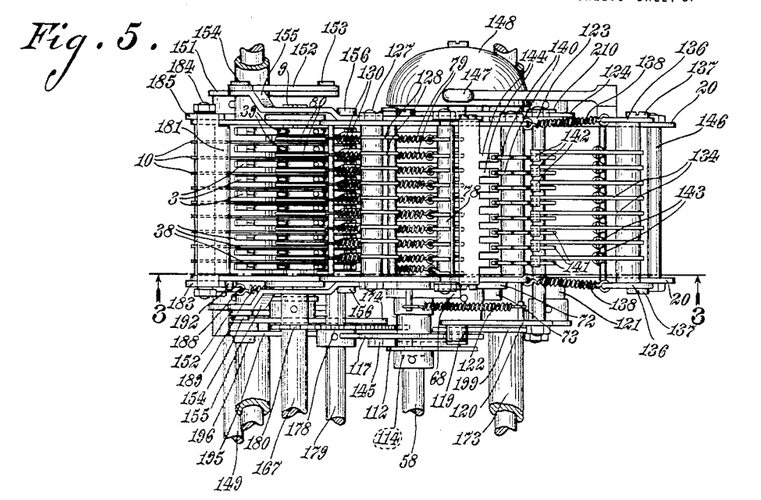
Fig. 5 is a top plan view of the accumulator.
Figure 10:
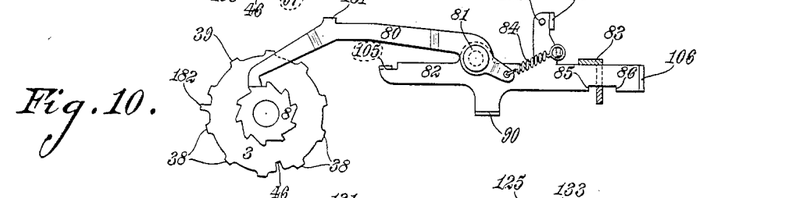
Fig. 10 is a diagrammatical view showing the position of a carry-over pawl when its accumulator wheel stands with a type-face thereon in printing position.
Figures 11, 12:
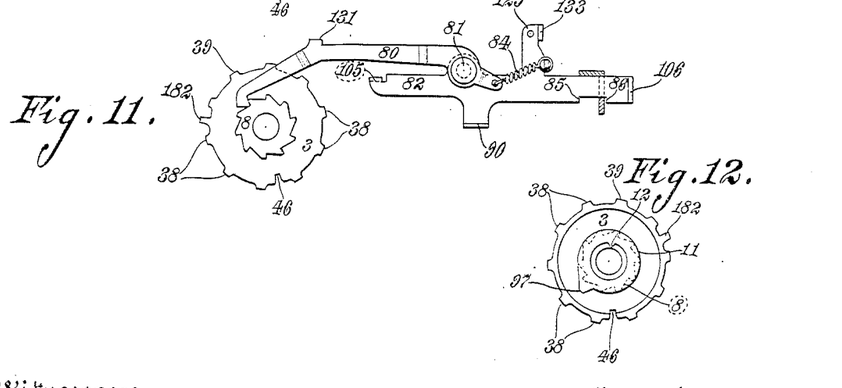
Fig. 11 is a diagrammatical view showing a carry-over pawl in position to rotate its accumulator wheel.
Fig. 12 is a detailed elevation of an accumulator wheel.

A pawl 74, Fig. 3, is provided for each ratchet 8 and is preferably arranged for longitudinally reciprocatory motion, these pawls having slots 75 and 76 to allow the cross-rods 77 and 78, respectively, to extend therethrough and being held in engagement with their respective ratchets by means of springs 79, their function being to prevent the accumulator wheels 3 from spinning and, also, to hold the accumulator wheels in printing position after the latter have been released by the members 40. The nose of pawl 74 normally occupies a position between two teeth of its ratchet 8, as best seen in Fig. 3, in order to allow the accumulator wheel 3 to be rotated rearwardly to set its zero type-face 39 in printing position in the manner hereinabove described. In addition to these pawls 75, a carry-over pawl 80 Figs. 3 and 7 to 11, is provided for each accumulator wheel 3, except the units accumulator wheel adjacent to the right-hand side of the accumulator, it being unnecessary, for obvious reasons, to provide a carry-over pawl for the units wheel. Said carry-over pawl 80 is pivotally attached at 81 to a plate 82, which is mounted to reciprocate longitudinally in guides 83 in the upper portion of the accumulator, and is held in engagement with its respective ratchet 8 by means of springs 84, there being as many plates 82 as carry-over pawls 80. Shoulders 85 and 86 on plate 82 are arranged to limit the movement of said plate by engagement with one of the guides 83, said plate 82 normally occupying such position that neither the shoulder 85 nor the shoulder 86 engage said guide, as best seen in Fig. 3, so as to allow said plate to be moved either toward the front or toward the rear of the machine. The nose of each carry-over pawl 80 normally rests upon the point of a tooth of its respective ratchet 8, as shown in Fig. 3, but, when its accumulator wheel 3 is released in order to allow the zero type-face 39 thereon to stand in printing position as hereinabove described, the nose of said pawl 80 rests upon the flat side of a tooth of said ratchet as illustrated in Fig. 10. When, however, the plate 82 is released in the manner hereinafter described, its spring 87, Fig. 3, draws same toward the operator, i. e., toward the left, Fig. 10, and thereby causes the carry-over pawl 80 borne by said plate to move therewith, whereby the nose of said pawl rides along the flat surface of a tooth of ratchet 8 until same drops in front of the point of said tooth, as illustrated in Fig. 11, in order to be in position to rotate the coöperating accumulator wheel 3 through substantially one-tenth of a revolution in the manner hereinafter described.

Figure 6:
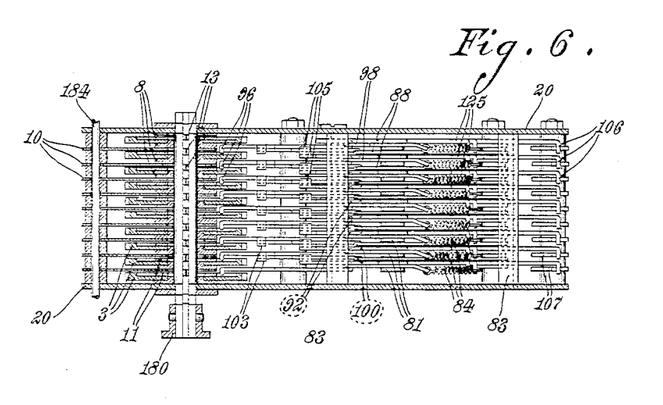
Fig. 6 is a sectional view on the line 6—6, Fig. 3.
Figures 8, 9:
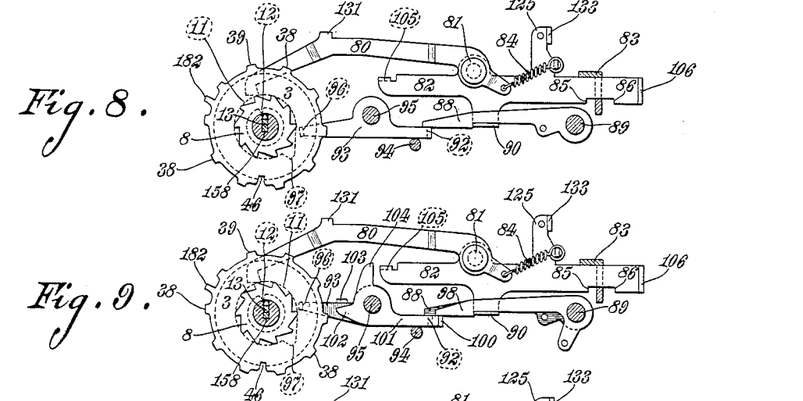
Fig. 8 is a diagrammatical view showing the units accumulator wheel and parts associated therewith for setting the carry-over pawl of the tens accumulator wheel.
Fig. 9 is a diagrammatical view showing the tens accumulator wheel and parts associated therewith for setting the carry-over mechanism of the hundreds accumulator wheel.

Each spring 87 tends to pull its respective plate 82 toward the operator, i. e., toward the left, Fig. 3, but such movement of said plate is normally arrested by hook 88, Figs. 3, 8, and 9, said hook being pivotally mounted on cross-rod 89 and being held normally in engagement with a projection 90 on said plate by means of a spring 53 which is attached to its coöperating latch 47, there being one such hook provided for each plate 82. As no carry-over pawl 80 and plate 82 are necessary for the units wheel 3, same are omitted, and, for this reason, the spring 53 which holds the latch 47 of the units wheel 3 in normal position is attached to cross-rod 91, Fig. 3. The end of hook 88 rests normally on a projection 92 borne by the rear end of lever 93 and thereby holds the rear end of said lever in a position resting upon cross-rod 94, as illustrated in Figs. 3, 8, and 9, said lever being pivotally mounted on cross-rod 95 and having a projection 96 formed on the front end thereof, which projection 96 protrudes into the path of rotation of projection 97 borne by ring 11 of the adjacent accumulator wheel 3 to the right of said lever, there being one such lever 93 provided for each accumulator wheel 3 except the wheel of the highest order, as illustrated in Fig. 6. The lever 93 of the units wheel 3 normally stands in the position depicted in Fig. 8, and, when same is rotated clockwise, so as to move its "9" type-face past printing position, the projection 97 on the ring 11 borne by said wheel strikes the projection 96 on lever 93 and thereby rocks said lever counter-clockwise, with the result that the projection 92 on the rear end of said lever lifts the hook 88 out of engagement with the projection 90 on its coöperating plate 82, whereupon spring 87 pulls said plate 82 toward the left, Fig. 3, until the shoulder 86 on said plate engages the guide 83. This movement of plate 82 sets the carry-over pawl 80 borne by same in position ready to rotate the tens accumulator wheel sufficiently to carry over the total from the units to the tens wheel, when said pawl is moved to produce the carry-over in the manner hereinafter described.

Figure 7:
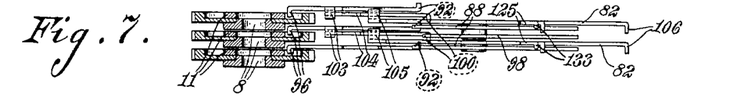
Fig. 7 is a horizontal sectional view through the centers of the units, tens, and hundreds accumulator wheels, showing the setting mechanism for carry-over pawls.

Each plate 82 to the left of the plate 82 that supports the carry-over pawl 80 of the tens accumulator wheel 3 is provided with an additional hook 98, Fig. 9, for holding same in its normal position, said hook 98 being pivotally mounted on cross-rod 89 and being held normally in engagement with the projection 90 on its respective plate 82 by means of spring 99, Fig. 3. The end of said hook 98 rests upon a projection 100, Fig. 9, borne by the rear end of lever 101 and thereby holds the rear end of said lever normally in a position resting upon cross-rod 94, these levers 101 corresponding in number to the hooks 98 and being pivotally mounted on cross-rod 95. Each lever 101 bears an arm 102, Fig. 9, which extends below a projection 103 borne by the forward arm of its companion lever 93, which arm of said lever 93 is arranged to hold the projection 96 on the end of same normally in position to be engaged by the projection 97 on the ring 11 of its coöperating wheel 3, when the latter is rotated clockwise, Fig. 9, to move its "8" type-face 38 past printing position so as to present its "9" type-face in printing position. During this movement of the accumulator wheel 3, the engagement of the projection 97 on its ring 11 with the projection 96 on its lever 93 results in rocking said lever counter-clockwise, Fig. 9, whereby the projection 92 on the rear end of said lever raises hook 88 out of engagement with projection 90 on its coöperating plate 82 and holds said hook in such raised position as long as the "9" type-face 38 on said wheel remains in printing position. The hook 98, however, remains in engagement with the projection 90 on said plate 82 and thereby holds said plate in its normal position, for the reason that the movement of lever 93 as just described merely releases hook 88 from engagement with projection 90 on said plate. Further rotation of the wheel 3 causes the projection 97 on its ring 11 to rock lever 93 further in a counter-clockwise direction, Fig. 9, whereby the projection 103 on said lever engages the arm 102 of its companion lever 101, thereby rocking said lever 101 counter-clockwise and causing the projection 100 on the rear end of said lever 101 to raise the hook 98 out of engagement with the projection 90 on said plate 82, whereupon spring 87 draws said plate toward the left so as to move the carry-over pawl 80 borne by said plate to a position to carry over the total to the wheel 3 of the next higher order. Each lever 101, also, bears an arm 104, Fig. 9, which stands in front of a projection 105 borne by the front end of the plate 82 to the right thereof, as best seen in Fig. 7. In case, however, the units wheel 3 is rotated so as to move its "9" type-face past printing position, the projection 97 on its ring 11 trips its lever 93, which, in turn, releases its coöperating hook 88 from engagement with the projection 90 on the plate 82, which bears the carry-over pawl 80 of the tens wheel 3, whereupon said plate is pulled toward the left, Fig. 3, by its spring 87, thereby setting said pawl in position to carry over the total from the units to the tens wheel. This movement of said plate 82 causes the projection 105 on the front end of same to strike the arm 104 of the lever 101 of the hundreds wheel 3 and thereby rock said lever, which, in turn, releases the coöperating hook 98 from engagement with the projection 90 on the plate 82 which bears the carry-over pawl 80 of the hundreds wheel 3. Under these circumstances, if the tens wheel 3 stands with its "9" type-face 38 in printing position, the projection 97 on its ring 11, through the medium of its coöperating lever 93 and hook 88, holds said hook 88 out of engagement with the projection 90 on the plate 82 that bears the carry-over pawl 80 of the hundreds wheel 3, so that, when the plate 82 of the tens wheel 3 is released and same, in moving toward the left, Fig. 3, releases the hook 98 of the hundreds wheel 3 from engagement with the projection 90 on its coöperating plate 82, the latter moves toward the left by the pull of its spring 87 and thereby moves its carry-over pawl 80 to the position to carry over the total from the tens to the hundreds wheel 3. In like manner when any other accumulator wheel 3 stands with its "9" type-face 38 in printing position and the plate 82 of the next wheel 3 to the right thereof is released, said plate in moving toward the left, Fig. 3, releases the next plate 82 to the left thereof as hereinabove described, so as to set the carry-over pawl 80 borne by the latter in position to carry over the total from the wheel 3 having its "9" type-face in printing position to the wheel 3 of the next higher order.

Each plate 82 has a projection 106 formed on the rear end of same, which projection, when said plate is released and moved toward the left, Fig. 3, is adapted to strike the rounded end 107 of one arm of a bell-crank 108, thereby to rock said bell-crank on cross-rod 109, with the result that the rounded end 110 of the other arm of said bell-crank presses downwardly on projection 111 borne by the rear end of its coöperating latch 47 and thereby rocks said latch, so as to release same from engagement with its coöperating member 40, which, in turn, descends by the pull of its spring 52 and moves its respective wheel 3 to a position to present the zero type-face 39 thereon in printing position. By this means, whenever an accumulator wheel is rotated sufficiently to set a carry-over pawl 80 in position to carry over the total to the next higher wheel 3, which still remains with its zero type-face 39 in its normal or non-printing position, the movement of the particular plate 82 that bears said pawl results in releasing the coöperating latch 47 from engagement with its member 40 as hereinabove described, whereupon spring 52 pulls said member downwardly and thereby sets the zero type-face 39 of the latter wheel 3 in printing position before said wheel is rotated by the carry-over pawl.

From the foregoing description, it will be observed that the function of each plate 82 when released is to set the carry-over pawl 80 in carrying-over position, but the actual movement of the carry-over pawl 80 for the purpose of producing the carrying-over of the total from one accumulator wheel 3 to the next accumulator wheel is produced by the depression of the operating handle or lever which causes the operating bar 55 to travel away from the operator, which movement of said bar rocks shaft 58 counter-clockwise, Fig. 1, as hereinabove described. A plate 112, Fig. 1, fixed to shaft 58 so as to rotate therewith, has a pawl 113 pivotally attached at 114 thereto, which pawl is held in engagement with a ratchet 115 by means of a spring 116, said ratchet being rotatably mounted on said shaft 58 and having a cam 117 fixed thereto. This cam is preferably somewhat like a star wheel and each tooth 118 thereof is rounded on one side for the purpose about to be described. A pin 119 borne by an arm 120 that is fixed to shaft 121, is normally held in a position resting between two teeth 118 of cam 117 by means of spring 122, as shown in Fig. 1. The arm 120 is located adjacent to one side of the accumulator and is connected with an arm 123, Fig. 2, adjacent to the other side of the accumulator by means of rod 124, said arm 123 being, also, fixed to shaft 121. Said rod 124 passes through the upper part of the accumulator and extends in front of the arms 125 on each plate 82, being normally in the position depicted in Fig. 1 so as to allow the plates 82 to be moved toward the left when same are released as hereinabove described. When the shaft 58 is rocked counter-clockwise, Fig. 1, the plate 112 rocks therewith and rotates the cam 117 through the instrumentality of pawl 113 and ratchet 115, whereby the rounded side of a tooth 118 of said cam presses against the pin 119 and thereby rocks the arm 120 toward the right, thus rocking shaft 121. This rocking of shaft 121 causes the arms 120 and 123 to move the rod 124 toward the right, Fig. 3, whereby said rod engages the arms 125 on plates 82 and thereby forces said plates toward the right, with the result that each plate 82 that had been previously moved to set its carry-over pawl 80 in carrying-over position in the manner hereinabove described is moved toward the right, thus causing the carry-over pawl 80 to rotate its wheel 3 sufficiently to produce the carry-over, such movement of said plates 82 being limited by the engagement of the shoulders 85 thereon with guide 83. By the time the plates 82 have reached the limit of their movement toward the right, the pin 119 will have ridden over one tooth 118 of cam 117, whereupon spring 122 pulls the arm 120 toward the left, Fig. 1, and thereby returns the pin 119 to its normal position in front of the next tooth 118, with the result that arms 120 and 121 return rod 124 to its normal position, thus allowing the plates 82 to return the carry-over pawls 80 to their normal position. Immediately after the carry-over pawls 80 are returned to their normal position, the jack 16 raises such rack bars 2 as have been pushed into the accumulator into engagement with their respective ratchets 8 as hereinabove described, after which the operating handle or lever is allowed to return to its initial position. The return movement of the operating handle or lever moves the operating bar 55 toward the front of the machine and thereby rocks the shaft 58 clockwise, Figs. 1 and 13. During the return movement of shaft 58, the plate 112 rotates therewith, and the pawl 113 carried by said plate rides idly over a tooth of ratchet 115, thereby allowing said ratchet and cam 117 to remain at rest until the operating handle or lever is again depressed in the usual manner.

In order to prevent the carry-over pawls 80 from being disengaged from their ratchets 8 while the former are being moved to produce the carry-overs, a detent 126, Fig. 3, is provided for each carry-over pawl, these detents being pivotally mounted on the cross-rod 127. Each detent 126 bears a finger 128, which is normally held in engagement with cross-rod 129 by means of spring 130. Each carry-over pawl 80 is provided with a projection 131, which, when said pawl occupies its normal position, stands in front of projection 132 borne by said detent as best seen in Fig. 3. When, however, a carry-over pawl 80 has been set in carry-over position as illustrated in Fig. 11 and is then moved toward the right to produce the carry-over, the projection 131 on same will pass underneath the projection 132 on its detent 126, whereby said detent prevents said carry-over pawl from disengaging its ratchet 8. The projections 131 on the carry-over pawls 80 which stand in normal position strike the projections 132 on their respective detents 126, when said pawls are moved toward the right, Fig. 3, and thereby merely rock said detents on cross-rod 127. In case a carry-over pawl 80 occupies the position depicted in Fig. 10 and same is moved toward the right, its nose merely slides along the flat side of a tooth of its ratchet 8 without rotating the latter, and the projection 131 on said pawl passes underneath the projection 132 on its detent 126.

The arm 125 of each plate 82 is provided with a projection 133, Figs. 1 and 3. A set of latches 134, one for each plate 82, is pivotally mounted on a rod 135 of a cradle 136, the arms of which are pivotally attached at 137 to the side plates 20 of the accumulator, and springs 138 operate to move such rod toward the left, Fig. 1. Each latch 134 has a shoulder 139, Fig. 3, adapted to snap over and lock itself to the projection 133 on arm 125 of its coöperating plate 82, when said plate is moved toward the left, Fig. 3, as hereinabove described. A controlling device 140, Fig. 3, is provided for each latch 134, each of these devices having a tail 141, which is located beneath a projection 142 on its respective latch, and when any one of the controlling devices is actuated to lower its tail 141, the corresponding latch will be permitted to descend by the pull of its spring 143 and allow its shoulder 139 to rest upon the projection 133 on the arm 125 of its respective plate 82. A spring 144, Fig. 3, is provided to hold the controlling device in operative and inoperative positions. Ordinarily, however, all the controlling devices will be set in inoperative position so that the latches 134 will be supported thereby, and will not engage the projections 133 borne by the plates 82, certain of these latches being released when the machine is being operated to simultaneously add a plurality of columns of numerals. Each latch 134 has an arm 145 which, when the respective plate 82 moves said latch toward the right, Fig. 3, and thereby rocks the cradle 136, engages the cross-rod 146, such latches as have been moved toward the right being thereby raised out of engagement with the projections 133 on arms 125 of their respective plates 82. The cradle 136 forms part of a signal for indicating when a carry-over has occured, it having a spring-supported clapper 147, Fig. 2, fixed thereto, and when the cradle is released by the disengagement of the latch or latches, it suddenly returns to initial position under the influence of its spring 138, the clapper striking and sounding the bell 148.

The use of the clearing key 14 removes all results from the accumulator, allowing each accumulator wheel 3 to return to its initial position. When the clearing key 14 is depressed, it rocks shaft 149 counter-clockwise, Figs. 1 and 3, through the medium of the arm 150 borne by said shaft and having a pivotal connection with said key. This rocking of shaft 149 raises a pair of arms 151, Figs. 1 and 2, thereby causing links 152, pivoted at 153 to the arms 151, respectively, to rise, the upper ends of each of said links 152 being pivoted at 154 to a pair of yokes 155, said yokes being pivoted at 156 to the outside of the accumulator casing 20. Each of said yokes 155 contains an opening 157, Fig. 2, the upper edge of which normally rests on comb 13, which fits in groove 158 in shaft 9, and by the pressure of yokes 155, is caused normally to hold the teeth of comb 13 out of space 15, by which means the accumulator wheels 3 are allowed to rotate without interference by engagement of projections 12 with comb 13 until such time as the clearing key 14 is pushed in, which, as aforesaid, results in raising links 152 and yokes 155 and thereby comb 13 into space 15, where same meets projections 12, when shaft 9 is rotated by the depression of the operating handle or lever for clearing purposes. Said shaft 9 is rotated to clear the machine by depression of the operating handle or lever in the following manner. When shaft 149 is rocked as aforesaid, it raises the arm 159, Fig. 13, which raises link 160 pivoted thereto at 161, there being a horizontal slot 162 in said link, into which slot a pin 163 borne by hook 164 projects, said hook being pivotally attached at 165 to arm 166 mounted on shaft 167. A pin 168 secured to frame 169 projects into a vertical slot 170 in the upper part of link 160, in order to guide the movement of said link, and normally seats in the upper end of said slot, which position keeps notch 171 in said hook 164 from engagement with pin 172 borne by the operating bar 55. When shaft 149 is rocked so as to raise arm 159 and thereby link 160, pin 163 is thus pushed up in such manner as to rock hook 164 upwardly, so that pin 172 will seat in notch 171 and when the operating bar 55 travels toward the right, Fig. 13, pin 172 pulls hook 164 with it, said hook thus pulling on arm 166, causing the latter to rock shaft 167 counter-clockwise, Fig. 13. The forward end of hook 164 normally rests upon cross-rod 173, as shown in Fig. 13, and when said hook is raised and moved toward the right as just described, same passes over and closely to cross-rod 173, which, in turn, prevents said hook from becoming disengaged from pin 172 until the operating bar 55 and clearing key 14 are returned to their initial position. A plate 174, Fig. 1, is rigidly mounted on shaft 167 and contains a cam slot 175 into which a pin 176 projects from arm 177 of a segmental rack 178, the latter being revolubly mounted on shaft 179 and meshing with pinion 180 rigidly mounted on shaft 9. When, as aforesaid, shaft 167 is rocked, the plate 174 revolves therewith and causes the cam slot 175 therein to press against pin 176, whereby the rack 178 revolves counter-clockwise, Fig. 1, and causes the pinion 179 and shaft 9 to rotate clockwise through substantially nine-tenths of a revolution, with the result that the teeth of comb 13 engage the projections 12 within space 15, said projections being on the rings 12 fastened to the accumulator wheels 3, by which engagement of the teeth of comb 13 with said projections all the accumulator wheels 3 are rotated to zero. The rotation of shaft 9 is limited to substantially nine-tenths of a revolution, as hereinabove described, in order that said accumulator wheels may stop at zero, said limitation being produced by the length of arc of segmental rack 178, same being prearranged exactly for that purpose. In order to prevent the accumulator wheels 3 from spinning past the zero position by reason of mere momentum, a plate 181, Fig. 1, engages projections 182, there being one such projection 182 on each accumulator wheel 3, and said projection 182 being so located as to stop the accumulator wheels at zero. The plate 181 is in rigid connection at one end thereof with plate 183, which is pivotally attached at 184 to one side of the accumulator casing 20, and at the other end thereof with arm 185, Fig. 2, which is mounted on pivot 184 at the other side of the accumulator casing 20. A member 186, Fig. 1, is pivoted at 187 to plate 183 and bears an eccentric eye 188 to which a spring 189 is attached. Said spring 189 is, also, attached to one side of the accumulator casing 20, and not only tends to rotate the member 186 clockwise on its pivot 187 so as to hold projection 190 on said member normally in engagement with projection 191 on plate 183, but, also, tends to rotate plate 183 counter-clockwise on its pivot 184 in order to hold said plate 183 normally in engagement with stop pin 192 as illustrated in Fig. 1. A lip 193 borne by member 186 protrudes into the path of rotation of arm 194 rigidly mounted on shaft 167, and, when said shaft is rocked as hereinabove described, the arm 194 rotates therewith and engages the lip 193, thereby rocking plate 183 clockwise, Fig. 1, which results in moving plate 181 into the path of rotation of projections 182 on wheels 3, so as to stop said wheels at zero. When shaft 167 has completed rotating in a counter-clockwise direction, Fig. 1, the arm 194 will have passed out of engagement with lip 193 on member 186, whereupon spring 189 returns plate 183 and member 186 to their initial positions, and, when the shaft 167 is rotated by the return movement of the operating handle or lever, the arm 194, in returning to its initial position trips the member 186 without rocking plate 183.

After the accumulator wheels 3 have been restored to zero as just described, same are rotated sufficiently to move the zero type-faces 39 to their normal or non-printing position by raising members 40 to their initial position in the following manner. A link 195, Fig. 1, is attached at one end thereof to plate 174 by means of pivot 196 and contains a slot 197 in the other end thereof, into which slot a stud 198 projects from one arm of a lever 199 fulcrumed on cross-rod 173, the other arm of said lever being connected with a pair of plates 201, Fig. 3, by means of a tie-rod 202, said plates being pivotally mounted on said cross-rod 173. The stud 198, Fig. 1, normally seats in the rear end of slot 197 and, when the shaft 9 is being rotated to turn the accumulator wheels to zero as hereinabove described, the plate 174 pushes the link 195 to the right, Fig. 1, but such movement of said link is an idle one until the forward end of slot 197 moves into engagement with stud 198, which occurs about the same time that the accumulator wheels 3 have been returned to zero printing position, this restoring of said wheels 3 to zero being accomplished by the first part of the forward rotation of plate 174 that causes the pin 176 to ride through the eccentric part of cam slot 175.

After the wheels 3 have been restored to zero as just described, the pin 176 rides in the eccentric part of cam slot 175 and thereby prevents the segmental rack 178 from further rotation, and the forward end of slot 197 so presses against stud 198 as to rock the lever 199 clockwise, Fig. 1. This rocking of lever 199 causes plates 201 to rock therewith, whereby one of the rods 203 that connects said plates 201 is moved upwardly against shoulders 204, Fig. 3, on members 40 and thereby raises said members to their normal position, with the result that the fingers 45 borne by said members reënter the notches 46 in their respective wheels 3, thus rotating same sufficiently to move the zero type-faces 39 thereon to their normal or non-printing position. When the members 40 are raised as just described, the projections 49 on latches 47 reëngage shoulders 50 on said members and thereby hold same in normal position. The shaft 149 has a pair of arms 205, Fig. 3, rigidly mounted thereon and, when the former is rocked by the depression of the clearing key 14, the arms 205 are thereby raised until the ends of same stand in front of the projections 27 borne by detents 28, so as to prevent said detents from being rocked out of engagement with arms 24, thus preventing the jack 16 from being dropped in case the operator attempts to actuate a rack bar 2. One of the yokes 155 bears an arm 206, Fig. 2, to which one end of a link 207 is pivoted at 208, the other end of said link being provided with a slot 209 into which a stud 210 projects from arm 123. The stud 210 normally seats in the forward end of slot 209, and, when the yokes 155 are raised by the depression of the clearing key 14, the arm 206 forces the link 207 toward the left, Fig. 2, thereby rocking arm 123 sufficiently to move and hold the rod 124 in touching engagement with arms 125 of plates 82, whereby the latter are held in their normal position and are prevented from being moved to set their carry-over pawls 80 in carrying-over position, as hereinabove described, in case any of the hooks 88 and 98 are released from engagement with the projections 90 on said plates 82 while the accumulator wheels 3 are being restored to zero. When, however, the arm 123 is rocked to produce the carry-over operation by the depression of the operating handle or lever as hereinabove described, the stud 210 moves idly through slot 209. After the accumulator wheels 3 have been restored to their normal or non-printing position as hereinabove described, the operating handle or lever is released, whereupon the operating bar 55 returns to its normal position in the usual manner and thereby causes reverse movement of shaft 167, thus restoring the parts of the clearing mechanism to normal position. Each plate 201 bears a projection 211, which, when the former is in normal position, rests upon shaft 25 as depicted in Fig. 3.

When the link 160 is raised by the depression of the clearing key 14 as hereinabove described, a projection 212, Fig. 13, borne by said link moves upwardly against projection 213 on plate 62 and thereby raises the latter sufficiently to raise the projection 61 on said plate 62 out of notch 60 in crank plate 57 and, also, raises the projection 213 into position in front of projection 214 on frame 169. A shoulder 215 on link 160 extends upwardly adjacent to the forward side of projection 213 on plate 62 and, when the link 160 raises the plate 62 as just described, the projection 213 on said plate 62 then occupies a position between shoulder 215 on link 160 and projection 214 on frame 169, in order to prevent said plate 62 and shaft 58 from being rotated when the operating bar 55 is moved toward the right, Fig. 13, by the depression of the operating handle or lever. When plate 62 is raised as just described, and the operating bar 55 is moved toward the right, Fig. 13, the pin 54 borne by said bar causes the crank plate 57 to rotate loosely on shaft 58 while the shoulder 215 on link 160 and projection 214 on frame 169 hold the plate 62 stationary for the time being, thereby preventing the shaft 58 from rotating. When the operating bar 55 returns to its initial position, the pin 54 returns the crank plate 57 to its normal position, whereupon the return of the clearing key to normal position allows spring 67 to lower the plate 62 to its normal position, thereby causing the projection 61 on said plate 62 to seat in notch 60 in crank plate 57 and, also, lowering the projection 213 sufficiently to allow the latter to pass the projection 214 on frame 169 when the plate 62 is rotated with plate 52 as hereinabove described. It will be understood that the operating bar 55 is reciprocatively supported by the main casing (not shown) of the machine and is operatively connected with the operating handle or lever, and the clearing key 14 extends outside the main casing of the machine as shown and described in our above-mentioned application.

From the foregoing, it is believed the operation of the carry-over and clearing mechanism will be readily understood, and requires no further description.

We claim:

1. In a calculating machine, the combination of a set of accumulator wheels, a set of reciprocatory members each controlled by said wheels, latches for holding each member in released position, a set of carry-over pawls each operative by one of said members, and auxiliary latches for said members, means operative upon each released member to actuate it and cause its coöperating carry-over pawl to effect the carry-over between the wheels.

2. In a calculating machine, the combination of a set of accumulator wheels, a set of reciprocatory members, a set of carry-over pawls each operative by one of said members, latches releasable by said wheels for holding said members normally in inoperative relation with respect to said wheels, auxiliary latches for said members, means for moving each released member to set its coöperating carry-over pawl in operative relation to its accumulator wheel, and means operative upon each released member to actuate it and cause its coöperating carry-over pawl to effect the carry-over between the wheels.

3. In a calculating machine, the combination of a set of accumulator wheels, a set of reciprocatory members, a set of carry-over pawls each carried by one of said members, a latch for holding each member normally in inoperative relation with respect to its coöperating wheel and releasable by the latter, means for moving each released member to set its carry-over pawl in operative relation with respect to its coöperating wheel, and a device operative upon each released member to reciprocate it.

4. In a calculating machine, the combination of a set of accumulator wheels, a set of reciprocatory members, a set of carry-over pawls each carried by one of said members, a latch for holding each member normally in inoperative relation with respect to its coöperating wheel, a tripping device for disengaging each latch from its coöperating member and operative by the latter, means for moving each released member to set its carry-over pawl in operative relation with respect to its coöperating wheel, and means operative upon each released member for reciprocating it.

5. In a calculating machine, the combination of a set of accumulator wheels each bearing a set of type-faces, a set of reciprocatory members, a set of carry-over pawls each carried by one of said members, a latch for holding each member normally in inoperative relation with respect to its coöperating wheel and releasable by the latter when rotated to move its "9" type-face past printing position, an auxiliary latch for each of said members except the member that coöperates with the accumulator wheel of the lowest order, each of said auxiliary latches being releasable by its coöperating wheel when the latter is rotated to present its "9" type-face in printing position, means for moving each released member to set its carry-over pawl in operative relation with respect to its coöperating wheel, and means operative to reciprocate each released member to produce the carry-over between the wheels.

6. In a calculating machine, the combination of a set of accumulator wheels each bearing a set of type-faces, a set of reciprocatory members, a set of carry-over pawls each carried by one of said members, a latch for holding each member normally in inoperative relation with respect to its coöperating wheel and releasable by the latter when rotated to move its "9" type-face past printing position, an auxiliary latch for each of said members except the member that coöperates with the accumulator wheel of the lowest order, each of said auxiliary latches being releasable by its coöperating wheel when the latter is rotated to present its "9" type-face in printing position, means for moving each released member to set its carry-over pawl in operative relation with respect to its coöperating wheel, means operative to reciprocate each released member to produce the carry-over between the wheels, and means operative by each member for releasing the next first-mentioned latch to the left thereof.

7. In a calculating machine, the combination of a set of accumulator wheels each bearing a set of type-faces, a set of reciprocatory members, a set of carry-over pawls each carried by one of said members, each member to the left of the right-hand member having a pair of latches for holding same normally in inoperative relation with respect to its coöperating wheel, each wheel to the left of the right-hand wheel having means operative thereby for releasing one of said latches when its coöperating wheel is rotated to present its "9" type-face in printing position, auxiliary means operative by said releasing means for releasing the other of said latches when its coöperating wheel is rotated to move its "9" type-face past printing position, a latch for holding the right-hand member in inoperative relation with respect to its coöperating wheel and releasable by the right-hand wheel when the latter is rotated to move its "9" type-face past printing position, means for moving each released member to set its carry-over pawl in operative relation with respect to its coöperating wheel, and means operative to reciprocate each released member to produce the carry-over between the wheels.

8. In a calculating machine, the combination of a set of accumulator wheels each bearing a set of type-faces, a set of reciprocatory members, a set of carry-over pawls each carried by one of said members, each member to the left of the right-hand member having a pair of latches for holding same normally in inoperative relation with respect to its coöperating wheel, each wheel to the left of the right hand wheel having means operative thereby for releasing one of said latches when its coöperating wheel is rotated to present its "9" type-face in printing position, auxiliary means operative by said releasing means for releasing the other of said latches when its coöperating wheel is rotated to move its "9" type-face past printing position, a latch for holding the right-hand member in inoperative relation with respect to its coöperating wheel and releasable by the right-hand wheel when the latter is rotated to move its "9" type-face past printing position, means for moving each released member to set its carry-over pawl in operative relation with respect to its coöperating wheel, means operative to reciprocate each released member to produce the carry-over between the wheels, and means operative by each member for actuating the auxiliary releasing means independently of said first-mentioned releasing means.

9. In a calculating machine, the combination of a set of accumulator wheels, a set of reciprocatory members, a set of carry-over pawls each carried by one of said members, latches releasable by said wheels for holding said members normally in inoperative relation with respect to said wheels, means for moving each released member to set its carry-over pawl in operative relation with respect to its accumulator wheel, a device operative to reciprocate each released member to produce the carry-over between the wheels, and a cam for operating said device.

10. In a calculating machine, the combination of a set of accumulator wheels, a set of reciprocatory members, a set of carry-over pawls each carried by one of said members, means releasable by said wheels for holding said members normally in inoperative relation with respect to said wheels, and means for moving each released member to set its carry-over pawl in operative relation with respect to its wheel.

11. In a calculating machine, the combination of a set of accumulator wheels, a set of reciprocatory members, a set of carry-over pawls each carried by one of said members, means releasable by said wheels for holding said members normally in inoperative relation with respect to said wheels, and means for moving each released member to set its carry-over pawl in operative relation with respect to its wheel.

12. In a calculating machine, the combination of a set of accumulator wheels, a set of reciprocatory members, a set of carry-over pawls each carried by one of said members, means releasable by said wheels for holding said members normally in inoperative relation with respect to said wheels, and means for moving each released member to set its carry-over pawl in operative relation with respect to its wheel.

13. In a calculating machine, the combination of a set of accumulator wheels, a set of reciprocatory members, a set of carry-over pawls each carried by one of said members, latches releasable by said wheels for normally holding said members in inoperative relation with respect to said wheels, auxiliary latches for said members, means for moving each released member in one direction to set its carry-over pawl in operative relation with respect to its accumulator wheel, and means for simultaneously returning the released members to normal position to effect the carry-over between the wheels.

14. In a calculating machine, the combination of a set of accumulator wheels, a set of reciprocatory members, a set of carry-over pawls each carried by one of said members, latches releasable by said wheels for normally holding said members in inoperative relation with respect to said wheels, auxiliary latches for said members, means for moving each released member to set its carry-over pawl in operative relation with respect to its accumulator wheel, means operative upon each released member to move same to effect the carry-over between the wheels, and means for preventing each carry-over pawl from becoming operatively disengaged from its wheel when said pawl is moved to produce the carry-over operation.

15. In a calculating machine, the combination of a set of accumulator wheels, a set of reciprocatory members, a pivoted carry-over pawl carried by each member, latches releasable by said wheels for normally holding said members in inoperative relation with respect to said wheels, auxiliary latches for said members, means for moving each released member to set its carry-over pawl in operative relation with respect to its accumulator wheel, and means operative upon each released member to move same to effect the carry-over between the wheels.

16. In a calculating machine, the combination of a set of accumulator wheels, a set of reciprocatory members, a pivoted carry-over pawl carried by each member, latches releasable by said wheels for normally holding said members in inoperative relation with respect to said wheels, auxiliary latches for said members, means for moving each released member to set its carry-over pawl in operative relation with respect to its accumulator wheel, means operative upon each released member to move same to effect the carry-over between the wheels, and a detent for each carry-over pawl adapted to prevent the latter from moving out of operative relation with its wheel when same is moved to produce the carry-over operation.

17. In a calculating machine, the combination of a set of accumulator wheels, a set of reciprocatory members, a set of carry-over pawls each carried by one of said members, means for moving each released member to set its carry-over pawl in operative relation with respect to its wheel, means operative upon the released members to move same to effect the carry-over between the wheels, and a signal operative by each member.

18. In a calculating machine, the combination of a set of accumulator wheels, a set of reciprocatory members, a set of carry-over pawls each carried by one of said members, means releasable by said wheels for normally holding said members in inoperative relation with respect to said wheels, means for moving each released member to set its carry-over pawl in operative relation with respect to its wheel, means operative upon the released members for moving same to effect the carry-over between the wheels, a cradle embodying a pair of pivoted members and a rod connecting same, a set of latches supported by said rod each being operative by one of said reciprocatory members, and a signal operative by one of said pivoted members.

19. In a calculating machine, the combination of a set of accumulator wheels, a set of reciprocatory members, a set of carry-over pawls each carried by one of said members, means releasable by said wheels for normally holding said members in inoperative relation with respect to said wheels, means for moving each released member to set its carry-over pawl in operative relation with respect to its wheel, means operative upon the released members for moving same to effect the carry-over between the wheels, a cradle embodying a pair of pivoted members and a rod connecting same, a set of latches supported by said rod each being operative by one of said reciprocatory members, a signal operative by one of said pivoted members, and devices operatively connecting and disconnecting said latches with respect to said signal.

20. In a calculating machine, the combination of a set of accumulator wheels, carry-over mechanism embodying a set of reciprocatory members, a carry-over pawl carried by each of said members, means releasable by said wheels for normally holding said members in inoperative relation with respect to said wheels, means for moving each released member to set its carry-over pawl in carry-over position, means operative upon each released member for moving same to effect the carry-over between the wheels, a cradle embodying a pair of pivoted members and a rod connecting same, a set of latches carried by said rod each being adapted to be engaged by one of said members when the latter is moved from carry-over position, a signal operative by one of said pivoted members, and means for automatically releasing said latches from operative engagement with said reciprocatory members.

21. In a calculating machine, the combination of a set of accumulator wheels, carry-over mechanism embodying a set of reciprocatory members, a carry-over pawl carried by each of said members, means releasable by said wheels for normally holding said members in inoperative relation with respect to said wheels, means for moving each released member to set its carry-over pawl in carry-over position, means operative upon each released member for moving same to effect the carry-over between the wheels, a cradle embodying a pair of pivoted members and a rod connecting same, a set of latches carried by said rod each being adapted to be engaged by one of said members when the latter is moved from carry-over position, a signal operative by one of said pivoted members, means for automatically releasing said latches from operative engagement with said reciprocatory members, and devices individual to said latches for holding them in disengaged relation to said reciprocatory members.

22. In a machine such as described, the combination of a set of accumulator wheels, clearing mechanism therefor, means for operating the clearing mechanism embodying a rock shaft, means for rocking said shaft, a cam borne by said shaft, a ratchet secured to the cam, an arm upon the shaft, and a pawl carried by the arm and engaging the ratchet as and for the purposes set forth.

23. In a calculating machine, the combination of a set of accumulator wheels, clearing mechanism therefor, means for operating the clearing mechanism embodying a rock shaft, a member borne by said shaft, an auxiliary shaft, a gear segment supported by said auxiliary shaft and operative by said member, and means operative by said gear segment for restoring the wheels to cipher printing position.

24. In a calculating machine, the combination of a set of accumulator wheels, clearing mechanism therefor, means for operating the clearing mechanism embodying a rock shaft, a member borne by said shaft and containing a cam slot, an auxiliary shaft, a gear segment supported by said auxiliary shaft and operative by the cam slot in said member, and means operative by said gear segment for restoring the wheels to cipher printing position.

25. In a calculating machine, the combination of a set of accumulator wheels, clearing mechanism therefor, means for operating the clearing mechanism embodying a rock shaft, a member borne by said shaft, means operative by said member for rotating the wheels to cipher printing position, and an arm borne by said shaft adapted to prevent the wheels from spinning past cipher printing position.

26. In a calculating machine, the combination of a set of accumulator wheels, clearing mechanism therefor embodying a rock shaft and means operative by said shaft for rotating the wheels to cipher printing position, an arm borne by said shaft, a cradle for preventing the wheels from spinning past cipher printing position, and a trigger borne by an arm of said cradle and operative by the first-named arm.

27. In a calculating machine, the combination of a set of accumulator wheels, clearing mechanism therefor, a set of reciprocatory members each bearing a carry-over pawl, means releasable by said wheels for normally holding said members in inoperative relation with respect to said wheels, means for moving each released member to set its carry-over pawl in operative relation with respect to its wheel, and means operative by the clearing mechanism for preventing the release of said members during the clearing operation.

28. In a machine such as described, the combination of a set of accumulator wheels, clearing mechanism therefor, means operative by the clearing mechanism for rotating the wheels to cipher printing position, an arm borne by the clearing mechanism, a cradle preventing the wheels from spinning past cipher printing position, and a trigger borne by an arm of the cradle and operative by the first-named arm.

29. In a calculating machine, the combination of a set of wheels, clearing mechanism for the same, means operated by the clearing mechanism for rotating the wheels to a predetermined position, an arm borne by the clearing mechanism, a cradle preventing the wheels from moving past the pre-determined position, and a trigger borne by an arm of the cradle and operative by the first-mentioned arm.

In testimony whereof we hereunto affix our signatures in the presence of two witnesses.

ALBERT J. MEIER.
WILLIAM L. SWIFT.
EDWIN L. RELLER.

Witnesses:
GLADYS WALTON,
NANCY C. THOMAS.